Dec. 4, 1934.    R. K. WINNING    1,982,895
CONTROL MECHANISM
Original Filed June 10, 1929
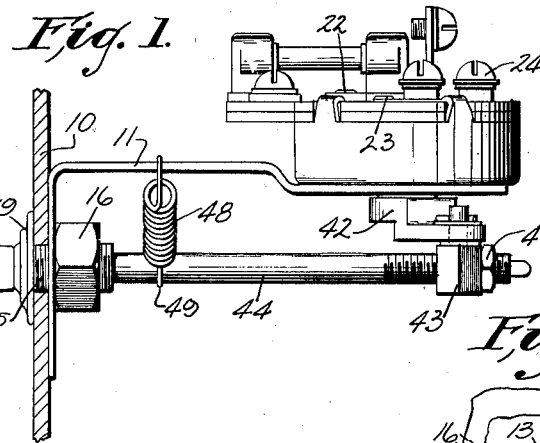
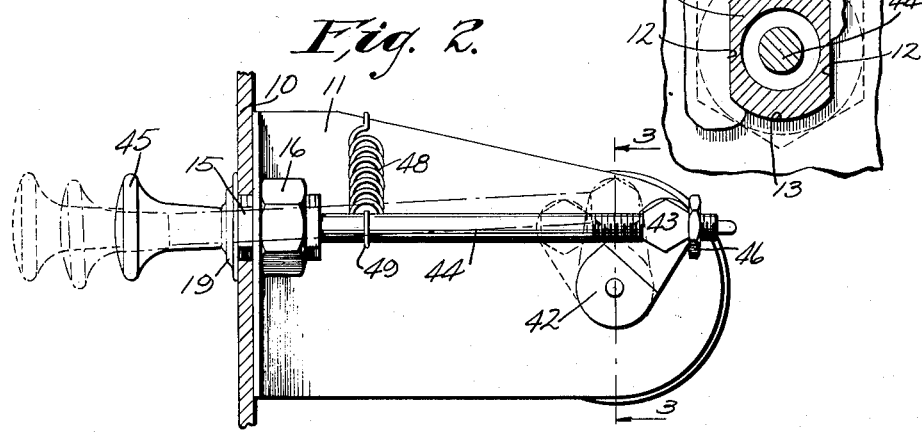
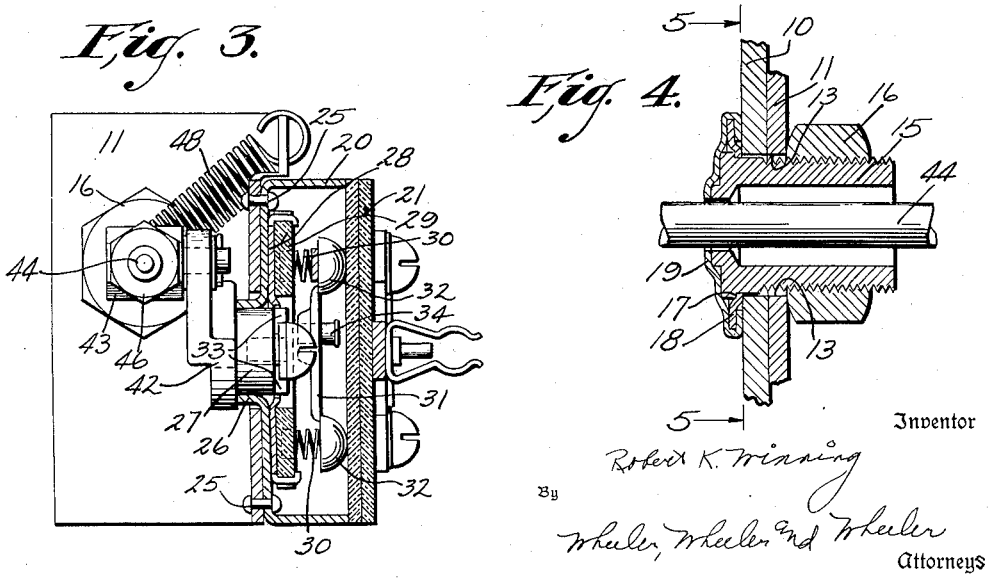
Inventor
Robert K. Winning
By
Wheeler, Wheeler and Wheeler
Attorneys Patented Dec. 4, 1934

1,982,895

UNITED STATES PATENT OFFICE 1,982,895

CONTROL MECHANISM

Robert K. Winning, Wauwatosa, Wis., assignor to Clum Manufacturing Company, Milwaukee, Wis., a corporation of Wisconsin Original application June 10, 1929, Serial No. 369,713. Divided and this application July 22, 1932, Serial No. 623,933

9 Claims. (Cl. 74—503)

This invention relates to improvements in control mechanism. It has particular reference to the mounting and operation of switches and the like for automotive practice. The present application is a division of my application Serial No. 369,713 filed June 10, 1929 and pertaining to switches.

It is the primary object of the invention to provide means whereby an instrument having a shaft to be controlled may be mounted on a bracket at the rear of the instrument panel with its shaft substantially parallel to the panel and connected by means of a push and pull rod extending through the same small opening used for the attachment of the mounting bracket to the panel. It is my further purpose to provide novel and improved means for mounting the entire appliance through a single hole in the instrument panel, and to provide in the mounting and the connections for the absorption of strains incident to the position and use of the instrument.

In the drawing:

Figure 1 is a plan view of my improved instrument mounting in association with a panel which appears in horizontal section.

Figure 2 is a side elevation of the parts shown in Figure 1.

Figure 3 is a view taken in section in the plane indicated at 3—3 in Figure 2.

Figure 4 is an enlarged detail in axial section through the special mounting bushing.

Figure 5 is a detail in section through the bushing in the plane indicated at 5—5 in Figure 4.

Like parts are identified by the same reference characters throughout the several views.

It will be understood that any desired instrument such as a rheostat or switch may be mounted on the bracket and actuated through the means herein described. For illustrative purposes I have illustrated a switch which is characterized by the provision of an operating shaft parallel to the instrument panel and adapted to be oscillated by the actuating means. In some aspects of the invention the presence and disposition of this shaft is significant irrespective of the particular instrument to be controlled thereby.

The switch is carried from panel 10 by a bracket 11 which is made of sheet metal and is L-shaped in plan as shown in Fig. 1. The panel and the arm of the bracket, which lies adjacent thereto, are each provided with registerable openings having flat sides at 12 and arcuate sides at 13 conforming in outline to the cross section of the flat faced bushing 15 as shown in Fig. 4. The arcuate peripheral portions of the bushing are threaded to receive nut 16 and the bushing is shouldered at 17 to receive a composite head which may be pressed against the panel by lock nut 16 to hold the bracket in place.

In the interests of economy it is preferred not to make the head of the bushing integral with the portion thereof which enters the panel. Accordingly such head comprises a washer 18 of relatively strong material having an off-set and apertured central portion engaging the shoulder 17 of the bushing. This washer is held in place against the shoulder and the bushing is exteriorly finished by the plate 19 which is spun over the end of the bushing and about the washer as shown in Fig. 3. The mounting device comprises the subject matter of my divisional application Serial No. 424,835 filed January 31, 1930.

The switch casing 20 is of the usual cupped form closed by a dielectric terminal head 21 carrying stationary terminals 22, 23 and 24. The switch casing is riveted at 25 to the bracket and has a central portion 26 pressed into tubular form and extended through an aperture in the bracket to provide a bearing sleeve for the rock shaft 27 which oscillates the switch actuator cup 28.

The switch actuator is screwed to rock shaft 27 and carries a dielectric member 29 socketed to receive the compression springs 30 which support the contact carrier 31 with its contacts 32 in positions for registry with the terminals 22, 23 and 24 of the terminal head 21. Lugs 33 on the rock shaft enter the actuator cup 28, as shown in Fig. 3, to ensure the transmission of movement from the rock shaft to the actuator for the purpose of oscillating the contact carrier, rotative movement being transmitted to the carrier through the pins 34.

Motion for the oscillation of the moving switch parts is provided by a crank 42, nut 43 swiveled thereto, rod 44 threaded in the nut and extending through the bushing 15, and handle 45 carried by the rod. The threaded connection between the rod and nut 43 permits adjustment of the handle to exactly the desired relation to the dash of the vehicle and the handle is held in the desired position by a lock nut 46. A tension spring at 48 is fastened to rod 44 and has an eye at 49 through which the rod is reciprocable. The spring merely serves to take up side play and to prevent rattle.

The fact that the instrument to be operated is mounted at one side of bracket arm 11 with its shaft extending therethrough, and the actuating connection to said shaft is provided at the opposite side of the arm, makes it possible to substantially align the connection between crank 42 and the actuating rod 44 with the opening in the panel, thereby minimizing the offset of bracket arm 11 and minimizing the strains to which the bracket is subjected in the reciprocation of rod 44.

The organzation is such that the entire apparatus is mounted and operated through a single small hole in the instrument panel. The flat sided bushing serves as a means for connecting the bracket and panel, as a means for securing the parts against angular displacement under load of the instrument and wiring attached thereto, and as a means through which the reciprocable actuating rod 44 may operate.

I claim:

1. The combination with a bracket having first and second angularly related apertured arms, of mounting means for the first arm comprising a tubular bearing, a rod movable through said bearing and provided with a handle, said rod being approximately parallel to the second arm of the bracket, an instrument mounted on said second bracket arm on the face thereof opposite to the first bracket arm and including a rock shaft projecting through the aperture of said second arm toward said rod, a crank on said rock shaft at the side of said second arm opposite to said instrument and between said second arm and said rod, and means connecting said rod with said crank for the operation of said instrument rock shaft.

2. The combination with an apertured panel, of a bracket secured to the panel and provided with an aperture registering with that of the panel, means in said apertures mounting said bracket to said panel, said bracket having an arm extending rearwardly from the panel at one side of the aperture therein, an encased instrument mounted wholly on said arm and provided with an operating shaft projecting across the plane of the arm toward a position of alignment with said apertures, crank means on said shaft, and a rod reciprocable through the apertures and operatively connected with said crank means for the manipulation of said shaft.

3. The combination with an apertured panel, of a bracket secured to the panel and having an arm projecting rearwardly in a plane substantially normal to the panel and at one side of the aperture, an encased instrument unit supported by the bracket arm wholly at the side opposite said panel aperture, a rock shaft operatively connected for the actuation of said unit and projecting therefrom toward the plane of the panel aperture, and an actuating rod reciprocable in the panel aperture substantially in said plane and operatively connected with said rock shaft for the operation thereof, the disposition of said instrument and rod at opposite sides of said bracket arm being adapted to reduce bending strains to which said arms would otherwise be subject in reciprocation of said rod.

4. The combination with a panel and an L-shaped bracket having registering apertures, of a bushing extending through said apertures and splined to said panel and bracket, means on said bushing for maintaining said panel and the apertured arm of said bracket in predetermined relation, a rock shaft approximately parallel to said panel at a point on the other arm of said bracket remote from said panel, an encased instrument connected with said other bracket arm wholly at one side thereof and provided with contact mechanism operatively connected with said rock shaft, actuating connections on said rock shaft at the other side of said bracket arm from said instrument, and a rod reciprocable through said bushing and operatively secured to said connections for the oscillation of said contact mechanism through said rock shaft.

5. The combination with a bracket having a panel engaging arm and an instrument supporting arm, of a bushing for mounting said panel engaging arm, said bushing having a central opening restricted as to diameter near its outer end, an instrument operating shaft carried by said instrument mounting arm and provided with a crank in substantial alignment with said panel, and an actuating shaft extending through said bushing and bearing in the restricted internal diameter thereof, said rod being connected with said crank and accommodated as to non-rectilinear movement by the enlarged internal diameter of said bushing.

6. In a device of the character described, the combination with a panel and bracket arms having registering openings, of a second bracket arm projecting rearwardly from the first and from the panel, a rock shaft carried by said second bracket arm and provided with a crank, an instrument carried by said second bracket arm at the side thereof opposite said crank, a bushing connecting said panel and bracket arm and extending through their registering apertures, said bushing having a relatively large internal diameter except at its outer end where its diameter is constricted, and an operating rod having a bearing in the constricted diameter of said bushing and connected with said crank for the oscillation of said rock shaft.

7. In a device of the character described, the combination with a panel and bracket arms having registering openings, of a second bracket arm projecting rearwardly from the first and from the panel, a rock shaft carried by said second bracket arm and provided with a crank, an instrument carried by said second bracket arm at the side thereof opposite said crank, a bushing connecting said panel and bracket arm and extending through their registering apertures, said bushing having a relatively large internal diameter except at its outer end where its diameter is constricted, and an operating rod having a bearing in the constricted diameter of said bushing and connected with said crank for the oscillation of said rock shaft, together with means providing an axially adjustable connection between said rod and crank whereby said rod may be adjusted as to its initial position with respect to said bushing.

8. The combination with a panel mounting bracket having first and second arms substantially at right angles to each other, each of said arms being apertured, of a panel having an aperture registering with that of the bracket, a tubular bolt extending through the apertures of panel and bracket, a nut threaded to said bolt anchoring one arm of said bracket to the panel, a rod reciprocable through said bolt and provided with an arm externally of the panel, an instrument casing mounted on the second arm of the bracket in spaced relation to the panel on the side of said arm opposite to said rod, an instrument wholly housed within said case, an operating shaft for said instrument extending from said case through the aperture of said second bracket arm toward said rod, a crank on said rock shaft, and means connecting said rod with said crank.

9. The combination with a panel and panel bracket having registering non-circular apertures, of a headed bushing corresponding in section to said apertures and engaged therein, said bushing having a threaded portion behind said bracket, a nut engaging said threaded portion and securing said bracket to said panel, a rod reciprocable through said bushing and having a handle externally of said panel, said bracket having an apertured arm projecting rearwardly of said panel and substantially parallel to said rod, an instrument casing riveted to the face of said bracket arm opposite said rod, an instrument housed within said casing and provided with a rock shaft projecting through the aperture of said bracket arm and provided with a crank between said bracket arm and rod, and means connecting said bracket arm and rod for the oscillation of said rock shaft in the course of reciprocation of said rod, said bracket, bushing and nut providing a single hole mounting for the support and actuation from said panel of an otherwise conventional instrument requiring an oscillatory movement for its actuation.

ROBERT K. WINNING.